United States Patent [19]

Friggstad

[11] Patent Number: 4,487,267
[45] Date of Patent: Dec. 11, 1984

[54] AGRICULTURAL APPARATUS WITH TOOL SUPPORTED THEREON AND WHEEL ADJUSTMENT STRUCTURE THEREFOR

[75] Inventor: Terrance Friggstad, Frontier, Canada

[73] Assignee: Friggstad Manufacturing Ltd., Frontier, Canada

[21] Appl. No.: 461,259

[22] Filed: Jan. 26, 1983

[51] Int. Cl.³ ............................................. A01B 63/22
[52] U.S. Cl. .................................. 172/310; 172/401; 172/414; 280/43.19; 280/43.23
[58] Field of Search ............... 172/310, 311, 400, 401, 172/413, 414, 415; 280/43.13, 43.19, 43.23

[56] References Cited

U.S. PATENT DOCUMENTS

| | | | |
|---|---|---|---|
| 436,985 | 9/1890 | Melder | 172/414 X |
| 664,686 | 12/1900 | Smith | 172/310 |
| 1,504,982 | 8/1924 | Shaner | 172/415 |
| 3,534,820 | 10/1970 | Groenke | 172/311 X |
| 4,387,772 | 6/1983 | Bourgault | 172/311 |

Primary Examiner—Richard T. Stouffer
Attorney, Agent, or Firm—Stanley G. Ade

[57] ABSTRACT

Apparatus for adjusting the depth of operation of a ground working tool on an agricultural apparatus comprises a strap which extends across a plurality of separate frame sections of the apparatus and incorporates a chain coupling which passes around a pulley wheel having an axis of rotation which is horizontal and transverse to the movement of the strap to communicate horizontal movement of the strap to vertical movement of a thrust bar. The thrust bar acts upon the axle of ground wheels so as to adjust the position of the ground wheels relative to the frame section. The ground working tool supported by the frame section is therefore adjusted relative to the ground to increase or decrease the depth of operation on the ground. The ground working tool can comprise an air seed boot and the frame of the apparatus can comprise a plurality of separate sections pivotally connected together to accommodate variations in the terrain.

17 Claims, 3 Drawing Figures

& # 35 ; # AGRICULTURAL APPARATUS WITH TOOL SUPPORTED THEREON AND WHEEL ADJUSTMENT STRUCTURE THEREFOR

BACKGROUND OF THE INVENTION

This invention relates to an agricultural apparatus and particularly to means for adjusting the depth of operation of a ground working tool thereof.

In our U.S. application Ser. No. 146,408, now U.S. Pat. No. 4,355,689, there is disclosed a flexible wing agricultural implement which comprises a plurality of separate frame sections pivotally coupled to one another and each incorporating ground wheels for supporting the frame sections relative to the ground. The whole implement is towed by a tractor and supports a plurality of ground working tools such as air seed drills. Each ground working tool is supported by a respective section of the frame and acts to dig into the ground to a predetermined depth, dependent upon the position of the frame section relative to the ground. In many cases, it is desirable to adjust the depth of working of the tool in the ground dependent upon the ground conditions or upon the crops concerned. This can, of course, be achieved by individual adjustment of each of the ground working tools relative to the respective frame section, but this is a long and laborious task with considerable opportunity for error. It is desirable therefore to provide a single adjustment mechanism which operates to adjust the depth of working of each of the ground working tools of the frame simultaneously.

A further problem which arises with this type of structure is that as the frame sections are pivotally mounted relative to one another to accommodate different levels, the common adjustment means must also accommodate such flexing of the frame sections relative to one another.

SUMMARY OF THE INVENTION

It is one object of the invention therefore to provide means for adjusting the depth of operation of a ground working tool of an agricultural apparatus which is suitable for use in an apparatus of the above described type.

Accordingly, the invention provides an agricultural apparatus comprising a main frame, ground wheel means for supporting the main frame a predetermined distance from the ground, a ground working tool supported by the main frame and arranged to operate on the ground to a depth determined by the position of the frame relative to the ground, and means for adjusting the position of the wheel means relative to the frame comprising a thrust bar, means mounting the thrust bar such that vertical movement of the thrust bar moves the wheel means vertically relative to the frame, an adjusting bar, means mounting the adjusting bar for horizontal movement on the frame, flexible coupling means connecting said adjusting bar to said thrust bar and pulley means rotatable about a horizontal axis transverse to the direction of movement of said adjusting bar for guiding said coupling means whereby horizontal movement of the adjusting bar causes said coupling means to move around the pulley and apply vertical force to said thrust bar.

It is one advantage of the invention therefore that vertical adjustment of the ground wheels relative to the frame can be achieved by a simple strap or bar extending across the frame section.

It is a further advantage of the invention that the adjustment can be achieved using chain lengths which are relatively short thus avoiding or reducing problems of stretching.

It is a yet further advantage of the invention that the bar or strap extending across the frame can be guided and maintained in proper location by cooperation with the thrust bar and with a yoke supporting the pulley.

It is a still further advantage of the invention that the single strap or bar can extend across a plurality of such frame sections with chain coupling between bar or strap sections so that a single bar or strap can operate the adjustment of the ground wheels on each of the frame sections simultaneously under the control of a cylinder/piston arrangement.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 3:
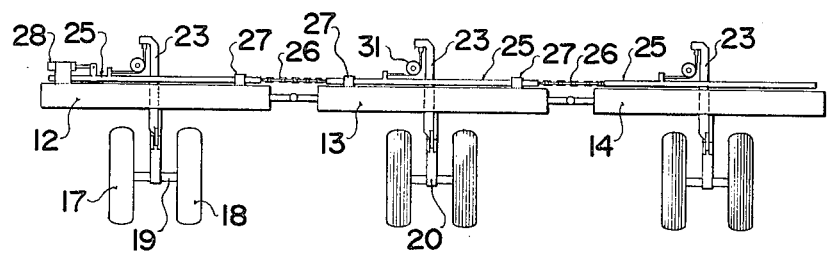
FIG. 3 is a schematic rear elevational view similar to FIG. 1 of a plurality of frame sections coupled together for towing by a tractor.

The agricultural apparatus illustrated schematically in full in FIG. 3 incorporates a frame 10 including a plurality, in this case three, of frame sections 12, 13 and 14 pivotally coupled together by couplings 15 and 16. As shown in more detail in FIG. 1, each frame section is supported by a pair of ground wheels 17 and 18 supported conventionally upon an axle 19. The axle 19 is supported on a pivot arm 20 mounted pivotally relative to the frame on a pivot pin 21. The axle 19 is also free to pivot about an axis parallel to the direction of movement of the wheels on a pivot pin 22 so as to allow the axle to find its own level dependent upon ground conditions.

The height of the axle 19 relative to the machine frame can be adjusted by a thrust bar 23 which is coupled to the pivot arm 20 at a mid-point thereof by a pivot linkage 24 which allows the thrust bar 23 to remain vertical as it moves vertically thus causing pivotal movement about the linkages 24 and 21.

Vertical adjustment of the thrust bar 23 of each of the frame sections is achieved by an adjusting bar 25 in the form of a strap which extends across each of the sections and incorporates flexible couplings 26 between each section and the adjacent section to accommodate the flexing of the frame sections as the frame moves over varying terrain. Each portion of the strap 25 on its respective frame section is guided by a pair of loops 27 through which it slides across the frame section along its length.

Figure 1:
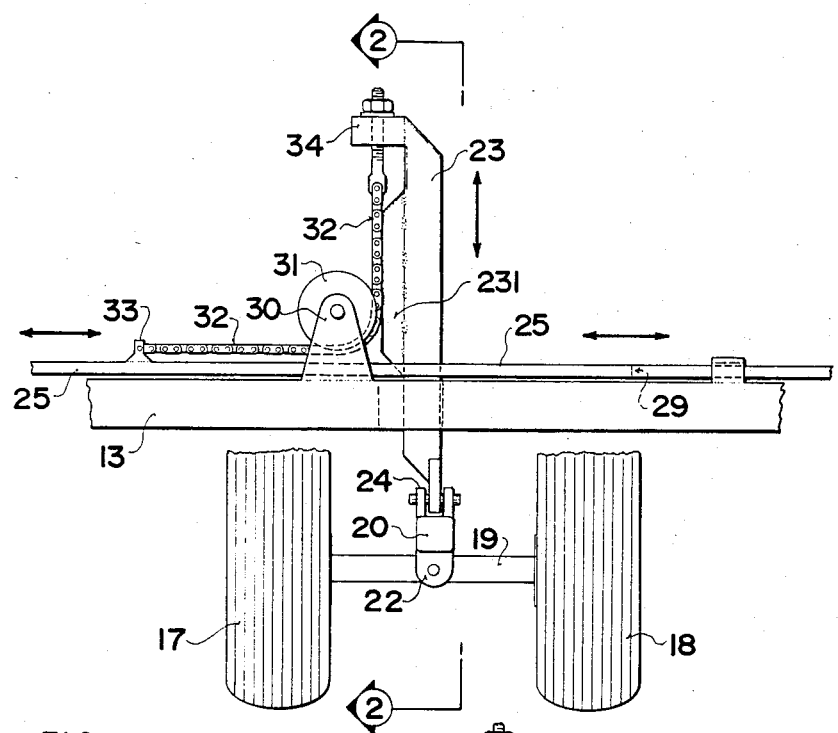
FIG. 1 is a rear view of a frame section of an agricultural apparatus with the ground working tool omitted for simplicity of illustration.

A piston and cylinder arrangement schematically indicated at 28 is included upon one of the frame sections for movement of the strap 25 along its length under control of the hydraulic system of the tractor. The piston is connected to the strap 25 and the cylinder to the respective frame section so that retraction of the piston into the cylinder causes the strap to move to the left as shown in FIGS. 1 and 3.

The strap is provided with a slot 29 adjacent each of the thrust bars 23 so that the thrust bar can pass through the slot in the strap 25 thus assisting to guide the strap in its motion. The extent of the slot 29 is sufficient to accommodate movement of the strap 25 to either extreme.

A yoke 30 supporting a pulley 31 is attached to the frame section astride the strap 25. The axis of the pulley is arranged horizontal and transverse to the strap 25. The pulley 31 cooperates with a chain 32 which is attached at one end to the strap 25 by a fixed coupling 33 and the other end to the thrust bar 23 by an adjustable coupling 34. The coupling 34 includes a block fixed to the thrust bar 23 and a nut and bolt connection from the chain 32 through the block by which the position of the end of the chain relative to the thrust bar 23 can be adjusted.

The thrust bar 23 includes an elongate extension 231 on the side adjacent the chain 32 to run against the chain and pulley 31 to prevent or inhibit movement of the bar 23 transversely toward the pulley 31.

Figure 2:
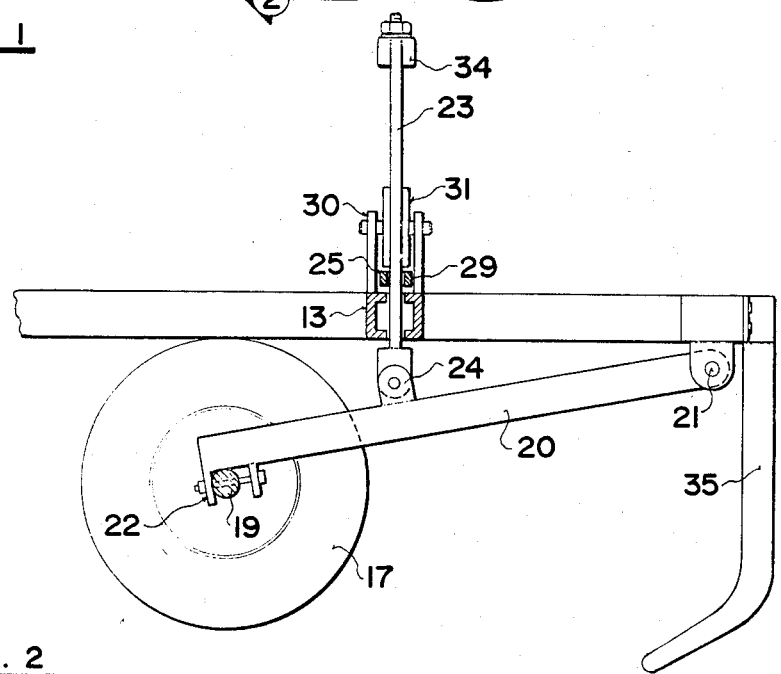
FIG. 2 is a side elevational view of the apparatus of FIG. 1 including a ground working tool schematically illustrated.

The ground working tool is shown schematically in FIG. 2 at 35 but it will be appreciated that such a ground working tool can comprise an air seed boot assembly of the type described in our U.S. application Ser. No. 253,794, now abandoned. The position of each of the ground working tools 35 relative to the ground is adjusted commonly by movement of the strap 25 across the frame sections 12, 13, 14 under control of the piston/cylinder 28. More specifically, as force is applied by the piston/cylinder 28 by the retraction of the piston into the cylinder, the strap 25 is moved to the left as shown in FIGS. 1 and 3 thus causing the chain 32 to move also to the left which rotates the pulley 31 in a clockwise direction and draws the coupling 34 downwardly towards the pulley 31. In this way, the thrust bar 23 is caused to move vertically downwards through the lot in the strap 25 to force the ground wheels on the axle 19 away from the frame section. Thus the position of the frame section relative to the ground is raised which acts to raise the position of the ground working tool 35 relative to the ground. Conversely, if the piston is allowed to extend relative to the cylinder under the force of gravity from the frame sections, the strap 25 moves to the right thus allowing the thrust bar to rise and the axle 19 to move closer to the machine frame section.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. An agricultural apparatus comprising a main frame, ground wheel means for supporting the main frame a predetermined distance from the ground, a ground working tool supported by the main frame and arranged to operate on the ground to a depth determined by the position of the frame relative to the ground, and means for adjusting the position of the wheel means relative to the frame comprising a thrust bar, means mounting the thrust bar such that vertical movement of the thrust bar moves the wheel means vertically relative to the frame, an elongate adjusting bar, means mounting the adjusting bar for horizontal movement along its length on the frame, flexible coupling means connecting said adjusting bar to said thrust bar and guide means for guiding movement of said coupling means about a horizontal axis transverse to the direction of movement of said adjusting bar whereby horizontal movement of the adjusting bar causes said coupling means to move around the axis and apply vertical force to said thrust bar, said adjusting bar including a slot therein through which the thrust bar extends.

2. Apparatus according to claim 1 wherein said coupling means comprises a chain.

3. Apparatus according to claim 1 wherein said ground wheel means includes a pivot arm, means mounting the pivot arm on the main frame for pivotal movement about a horizontal axis and means coupling the thrust bar to the pivot arm whereby vertical movement of the thrust bar causes the pivot arm to pivot relative to the main frame.

4. Apparatus according to claim 1 wherein said ground wheel means includes an axle and two wheels mounted on said axle.

5. Apparatus according to claim 1 including yoke means for supporting said guide means wherein said adjusting bar extends through the yoke means.

6. Apparatus according to claim 1 including means for connecting said coupling means to said thrust bar, said means being adjustable to move the position of the thrust bar relative to the coupling means.

7. Apparatus according to claim 1 including a plurality of said ground wheel means and a corresponding plurality of said adjusting means for the position of the ground wheel means relative to the frame wherein said adjusting bar acts to operate all said position adjusting means.

8. Apparatus according to claim 7 including a hydraulic piston and cylinder for operating said adjusting bar.

9. Apparatus according to claim 7 wherein said machine frame is divided into a plurality of sections, each said frame section including a respective one of said plurality of ground wheel means, wherein each of said frame sections includes coupling means for coupling each said frame section to an adjacent said frame section, said coupling means allowing pivotal movement between each said frame section and the adjacent said frame section, and wherein said adjusting bar is divided into a plurality of bar sections, each said bar section corresponding to one of said frame sections and wherein said adjusting bar includes flexible connection means for connecting the sections thereof between said frame sections.

10. An agricultural apparatus comprising a main frame, ground wheel means for supporting the main frame a predetermined distance from the ground, a ground working tool supported by the main frame and arranged to operate on the ground to a depth determined by the position of the frame relative to the ground, and means for adjusting the position of the wheel means relative to the frame comprising a thrust bar, means mounting the thrust bar such that vertical movement of the thrust bar moves the wheel means vertically relative to the frame, an elongate adjusting bar, means mounting the adjusting bar for horizontal movement along its length on the frame, flexible coupling means connecting said adjusting bar to said thrust bar and guide means for guiding movement of said coupling means about a horizontal axis transverse to the direction of movement of said adjusting bar whereby horizontal movement of the adjusting bar causes said coupling means to move around the axis and apply vertical force to said thrust bar, including yoke means for supporting said guide means wherein said adjusting bar extends through the yoke means.

11. Apparatus according to claim 10 wherein said coupling means comprises a chain.

12. Apparatus according to claim 10 wherein said ground wheel means includes a pivot arm, means mounting the pivot arm on the main frame for pivotal movement about a horizontal axis and means coupling the thrust bar to the pivot arm whereby vertical movement of the thrust bar causes the pivot arm to pivot relative to the main frame.

13. Apparatus according to claim 10 wherein said ground wheel means includes an axle and two wheels mounted on said axle.

14. Apparatus according to claim 10 including means for connecting said coupling means to said thrust bar, said means being adjustable to move the position of the thrust bar relative to the coupling means.

15. Apparatus according to claim 10 including a plurality of said ground wheel means and a corresponding plurality of said adjusting means for the position of the ground wheel means relative to the frame wherein said adjusting bar acts to operate all said position adjusting means.

16. Apparatus according to claim 15 including a hydraulic piston and cylinder for operating said adjusting bar.

17. Apparatus according to claim 15 wherein said machine frame is divided into a plurality of sections, each said frame section including a respective one of said plurality of ground wheel means, wherein each of said frame sections includes coupling means for coupling each said frame section to an adjacent said frame section, said coupling means allowing pivotal movement between each said frame section and the adjacent said frame section, and wherein said adjusting bar is divided into a plurality of bar sections, each said bar section corresponding to one of said frame sections and wherein said adjusting bar includes flexible connection means for connecting the sections thereof between said frame sections.

* * * * *